(12) United States Patent
Choi et al.

(10) Patent No.: US 8,482,450 B2
(45) Date of Patent: Jul. 9, 2013

(54) METHOD FOR CONTROLLING EXTERNAL DEVICE AND REMOTE CONTROLLER THEREOF

(75) Inventors: Sun Young Choi, Pyeongtaek-si (KR); Woo Jin Jeong, Pyeongtaek-si (KR); Man Gu Kwon, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 12/826,233

(22) Filed: Jun. 29, 2010

(65) Prior Publication Data

US 2011/0050478 A1   Mar. 3, 2011

(30) Foreign Application Priority Data

Sep. 1, 2009 (KR) .................... 10-2009-0082187
Sep. 22, 2009 (KR) .................... 10-2009-0089320
Sep. 22, 2009 (KR) .................... 10-2009-0089499

(51) Int. Cl.
    *G08C 19/00*   (2006.01)
(52) U.S. Cl.
    USPC ........................................... 341/176
(58) Field of Classification Search
    USPC .................. 341/176–177; 375/238–239
    See application file for complete search history.

(56) References Cited

U.S. PATENT DOCUMENTS

| | | | |
|---|---|---|---|
| 5,952,936 A | 9/1999 | Enomoto | |
| 7,049,995 B2* | 5/2006 | Nierzwick et al. | 341/177 |
| 7,307,574 B2 | 12/2007 | Kortum et al. | |
| 2002/0194596 A1 | 12/2002 | Srivastava | |
| 2004/0148629 A1 | 7/2004 | Shibamiya et al. | |
| 2007/0258718 A1 | 11/2007 | Furlong et al. | |
| 2008/0060047 A1 | 3/2008 | Holliday et al. | |

FOREIGN PATENT DOCUMENTS

| | | |
|---|---|---|
| CN | 1790435 A | 6/2006 |
| KR | 10-2006-0005878 A | 1/2006 |
| KR | 10-0718437 B1 | 5/2007 |
| KR | 10-2008-0001326 A | 1/2008 |
| KR | 10-2009-0017797 A | 2/2009 |
| WO | WO 2008/013131 A1 | 1/2008 |

\* cited by examiner

*Primary Examiner* — Hieu Nguyen
(74) *Attorney, Agent, or Firm* — Birch, Stewart, Kolasch & Birch, LLP

(57) ABSTRACT

A method for controlling devices connected together, and which includes determining a type of a first device when the first device is connected to a transmitting device, determining what key buttons on a remote controller are needed to operate the determined type of the first device, activating the key buttons on the remote controller that are needed to operate the determined type of the first device, receiving an input signal indicating a selection of at least one key button needed to operate the determined type of the first device, transmitting the received input signal to a second device that is different than the first device, generating, by the second device, a remote control signal corresponding to the received input signal, transmitting, by the second device, the generated remote control signal to the first device, and performing a function on the first device corresponding the input signal indicating the selection of said at least one key button on the remote controller.

19 Claims, 9 Drawing Sheets

METHOD FOR CONTROLLING EXTERNAL DEVICE AND REMOTE CONTROLLER THEREOF

CROSS-REFERENCE TO A RELATED APPLICATION

Pursuant to 35 U.S.C. §119(a), this application claims the benefit of earlier filing date and right of priority to Korean Application No. 10-2009-0082187, filed on Sep. 1, 2009, Korean Application No. 10-2009-0089320, filed on Sep. 22, 2009, and Korean Application No. 10-2009-0089499, filed on Sep. 22, 2009, the contents of which are hereby incorporated by reference herein in their entireties.

BACKGROUND OF THE INVENTION

1. Field of the Invention

The present invention relates to a method for controlling an external device and a remote controller thereof, and more particularly, to a method for controlling an external device in a system transmitting and receiving a media signal using a wireless network.

2. Discussion of the Related Art

A display device includes a receiver that receives a media signal including video and audio from a broadcasting system, a cable system, and other external apparatuses (VCR, DVD, etc.) and processes and outputs the received media signal. The display device also includes a display unit that displays the video of the processed media signal on a screen. In addition, the receiver and the display unit can be individually separated from each other. For example, a wireless type display system can transmit a media signal received using an additional receiving device through wireless communication and displays the transmitted media signal on the display.

The display device can also be interfaced with several different types of devices such as a disc player, home theatre systems, game player devices, etc. Thus, the user must operate several different remote control devices to operate the individual devices. The operation of the several different devices is often cumbersome and tedious for users.

SUMMARY OF THE INVENTION

Accordingly, an object of the present invention is to address the above-noted and other problems.

Another object of the present invention is to provide a novel system and method for operating devices connected together.

To achieve these and other advantages and in accordance with the purpose of the present invention, as embodied and broadly described herein, the present invention provides in one aspect a method for controlling devices connected together, and which includes determining a type of a first device when the first device is connected to a transmitting device, determining what key buttons on a remote controller are needed to operate the determined type of the first device, activating only the key buttons on the remote controller that are needed to operate the determined type of the first device, receiving an input signal indicating a selection of at least one key button needed to operate the determined type of the first device, transmitting the received input signal to a second device that is different than the first device, generating, by the second device, a remote control signal corresponding to the received input signal, transmitting, by the second device, the generated remote control signal to the first device, and performing a function on the first device corresponding the input signal indicating the selection of said at least one key button on the remote controller.

In another aspect, the present invention provides a system for controlling devices connected together, and which includes a display device including a remote control interface and an extraction device, a remote control configured to interface and control an operation of the display device through the remote control interface, and a transmitting device configured to interface with an external apparatus and the display device. Further, when an input key is selected on the remote control intended for performing an operation on the external apparatus, the remote control is further configured to generate a first remote control signal including control data corresponding to performing the operation on the external apparatus and to transmit the remote control signal to the remote control interface of the display device, the display device is further configured to convert the first remote control signal received from the remote control including the control data into a wireless control communication signal different than the first remote control signal and to transmit the wireless communication signal to the transmitting device, and the transmitting device is further configured to receive the wireless communication signal from the receiving device, generate a second remote control signal that includes the control data and transmit the second remote control signal including the control data to the external apparatus such that the external apparatus can be operated via the remote control interfacing with the display device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF PREFERRED EMBODIMENTS

Hereinafter, a method for controlling an external device and a remote controller thereof according to embodiments of the present invention will be described in detail with reference to the accompanying drawings.

Figure 1:
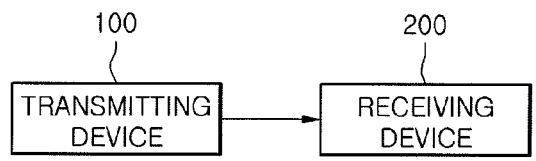
FIG. 1 is a block diagram of a transmitting/receiving system according to an embodiment of the present invention.

FIG. 1 is a block diagram illustrating a signal transmitting/receiving system according to an embodiment of the present invention. As shown, the transmitting/receiving system includes a transmitting device 100 and a receiving device 200. Further, the transmitting device 100 receives a media signal including video and audio from a broadcasting system, a cable system, or external apparatuses and converts the received media signal into data of a wireless transmittable format and wirelessly transmits the data to the receiving device 200.

The receiving device 200 then receives and processes data wirelessly transmitted from the transmitting device 100 using one or more wireless communication schemes for wirelessly transmitting and receiving data previously established between the transmitting device 100 and the receiving device 200. The receiving device 200 may also be a television or a receiving device 200 associated with a television. Further, the transmitting device 100 includes various input terminals such as a high-definition multimedia interface (HDMI) terminal connected with an antenna or external apparatuses, a universal serial bus (USB) terminal, a component terminal, an external input terminal, an RGB terminal, an antenna cable terminal, etc. and can receive the media signal using the input terminals. For example, the media signal may include a media signal received using the antenna, a cable, or the like or video signals and audio signals received from connected external devices in the transmitting device 100.

In addition, the transmitting device 100 may be a set-top box (STB) that receives the media signal using a wired or wireless network and converts and wireless transmits the received media signal to the receiving device 200. However, the transmitting device 100 according to an embodiment of the present invention is not limited to the set-top box (STB) and may include all kinds of devices that can receive the media signal transmitted from the outside and wirelessly transmit the received media signal to the receiving device 200. For example, the transmitting device 100 may be implemented by being provided in a computer or a portal terminal such as a cellular phone, etc.

Further, the receiving device 200 receives and processes the data wirelessly transmitted from the transmitting device 100, and thereafter outputs the video or audio included in the media signal. For example, the receiving device 200 can convert the video signal wirelessly transmitted from the transmitting device 100 into a displayable format and output the video signal on a display screen. More specifically, when the video signal wireless transmitted from the transmitting device 100 is encoded by a coding scheme such as an MPEG, etc., the receiving device 200 decodes the received video signal to output the decoded video signal to the display screen.

According to one embodiment of the present invention, the transmitting device 100 and the receiving device 200 can transmit and receive the media signal using various wireless communication schemes, for example, wireless communication schemes such as wireless HD (WiHD), wireless home digital interface (WHDi), wireless Lan (WiFi), etc. In more detail, the WiHD uses a frequency band of approximately 60 GHz and can transmit and receive data at a transmission rate of approximately 4 Gbps to thereby transmit HD video data of 1080p (1902×1080) without compression. However, WiHD uses a high frequency band of 60 GHz such that a data transmitting/receiving distance is approximately 10 m and the transmission/reception quality may be easily influenced by obstacles in the vicinity of an installation space.

In addition, WHDi can transmit and receive the data at transmission rate of approximately 1.8 Gbps using a frequency band of approximately 5 GHz. Further, WHDi uses a comparatively low high frequency band of 5 GHz such that the data transmitting/receiving distance is approximately 30 m and the transmission/reception quality is not greatly influenced by obstacles in the vicinity of the installation space. Meanwhile, when HD video data of 1080p (1920×1080) is transmitted using WHDi at the transmission rate of approximately 1.8 Gbps, the transmitting device 100 needs to partially compress and transmit the HD video data.

Further, WiFi can transmit and receive the data at transmission rate of approximately 54 Mbp using a frequency band of approximately 2.4 GHz. The WiFi also uses a comparatively low high frequency band of 2.4 GHz such that the data transmitting/receiving distance is approximately 50 to 200 m and the transmission/reception quality is not significantly influenced by obstacles in the vicinity of the installation space. Meanwhile, when HD video data of 1080p (1920×1080) is transmitted using WiFi at the low transmission rate of approximately 54 Mbp, the transmitting device 100 needs to compress and transmit the HD video data and as a result, the image quality of the video signal received from the receiving device 200 may be deteriorated.

Further, the transmitting device 100 and the receiving device 200 can wirelessly transmit and receive data for the media signal using various short-range wireless communication schemes, for example, communication schemes such as Bluetooth, ZigBee, or binary code division multiple access (CDMA), etc. in addition to the above-mentioned wireless communication schemes. Also, the transmitting device 100 and the receiving device 200 can transmit video and audio data using any one of various wireless communication schemes. In addition, the transmitting device 100 and the receiving device 200 can transmit and receive the video and audio data using two or more schemes of the wireless communication schemes, for example, any one of two or more supportable schemes can be selected according to the performance, installation environment, video resolution, etc. of each of the transmitting device 100 and the receiving device 200 to be used for data transmission/reception.

Figure 2:
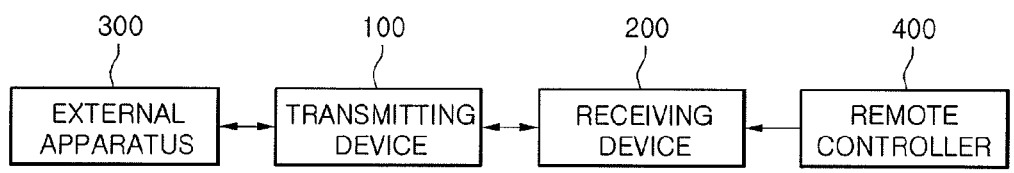
FIG. 2 is a block diagram illustrating a transmitting/receiving system according to another embodiment of the present invention.

Next, FIG. 2 is a block diagram illustrating a transmitting/receiving system according to another embodiment of the present invention. As shown, the system includes the transmitting device 100, the receiving device 200, an external apparatus 300, and a remote controller 400. The transmitting device 100 and the receiving device 200 were discussed with respect to FIG. 1. Also, as discussed above, the transmitting device 100 and the receiving device 200 can transmit and receive data using a wireless communication scheme, i.e., WiHD, WHDi, WiFi, or the like.

In addition, the transmitting device 100 is connected to the external apparatus 300 and can receive a video signal and an audio signal from the external apparatus 300. For example, the transmitting device 100 can include input/output terminals such as an HDMI, a USB, a component, an RGB, etc. for transmitting and receiving data to and from the external apparatus 300. Further, the external apparatus 300 may be various devices including a video playing device such as a DVD player, a Divix player, a blue-ray player, or the like, a set-top box such as an IPTV set-top box, a cable set-top box, a satellite set-top box, or the like, a PC, a game machine, a home theater, a portable terminal, a hard disk (HDD) recorder, etc. However, the external apparatus 300 connected to the transmitting device 100 according to the embodiment of the present invention is not limited to the above-mentioned devices and may include various devices that are connected to the transmitting device 100 to output a media signal such as the video signal to the transmitting device 100.

In addition, the remote controller 400 transmits a remote control signal for controlling the receiving device 200 according to a user input, and the receiving device 200 receives the remote control signal from the remote controller 400 to perform an operation corresponding to the remote control signal. For example, the remote controller 400 includes a plurality of key buttons for a user's key input and generates and transmits a remote control signal corresponding to the user's input for any one of the plurality of key buttons to the receiving device 200.

More specifically, the remote controller 400 can generate and transmit an infrared signal corresponding to the user's key input, and the receiving device 200 can receive the infrared signal and perform an operation corresponding to the received infrared signal. For example, the remote controller 400 and the receiving device 200 can include an IR transmitter and an IR receiver for transmitting and receiving the infrared signal, respectively. However, the present invention is not limited to transmission and reception of the remote control signal using the infrared communication scheme and the remote control signal can be transmitted and received between the remote controller 400 and the receiving device 200 using various wireless communication methods, for example, a communication method using an RF signal or an optical signal different than the infrared communication scheme.

According to an embodiment of the present invention, the remote controller 400 can also transmit a remote control signal for controlling the external apparatus 300, for example, an infrared signal to the receiving device 200. That is, the remote controller 400 can receive key inputs corresponding to a predetermined operation of the external apparatus 300 from a user, and generate and transmit an infrared signal corresponding to the key inputs to the receiving device. In this instance, the receiving device 200 receives the infrared signal for the external apparatus 300 from the remote controller 400 and wirelessly transmits data for controlling the external apparatus 300, which is included in the received infrared signal to the transmitting device 100. Thus, the receiving device 200 converts the signal received for the remote controller 400 (e.g., an infrared signal) into a WiHD, WHDi, WiFi, etc. signal used to communicate with the transmitting device 100.

More specifically, the receiving device 200 wirelessly transmits control data for the external apparatus 300 to the transmitting device 100 using a wireless network connected to the transmitting device 100, for example, the wireless communication scheme such as the WiHD, WHDi, WiFi, or the like. In addition, the transmitting device 100 can wirelessly receive the control data from the receiving device 200 and transmit the received control data to the external apparatus 300. Therefore, the external apparatus 300 can perform an operation corresponding to user's key input using the remote controller 400.

Also, in order to control the external apparatus 300, the transmitting device 100, and the receiving device 200 shown in FIG. 2, the user previously had to use a plurality of remote control devices corresponding to the devices. Also, in order to control any one device of the devices, the user had to move near a location adjacent to the device with the correct remote control device and perform key input in the remote control device, which corresponds to his/her desired operation. Therefore, when the external apparatus 300 is installed far away from the receiving device 200, the user who watches a broadcast at a location adjacent to the receiving device 200 has to inconveniently move to the location where the corresponding apparatus is installed in order to control the external apparatus 300.

However, according to an embodiment of the present invention, the receiving device 200 receives the remote control signal for controlling the external apparatus 300 connected to the transmitting device 100 from the remote controller 400 and transmits the control data for the received remote control signal to the transmitting device 100 using the wireless communication scheme connected to the transmitting device 100 to allow the corresponding device to perform an operation corresponding to the remote control signal. Thus, the user can control the operation of the external apparatus 300 using the remote controller 400 at a location adjacent to the receiving device 200.

Further, when the receiving device 200 is a television, the user usually is watching the screen of the television. Thus, the user can continue to view the television while controlling the external apparatus 300. That is, the user does not have to stop viewing the television to control the external apparatus 300, but can continually look at or view information on the television while controlling the external apparatus 300.

Figure 3:
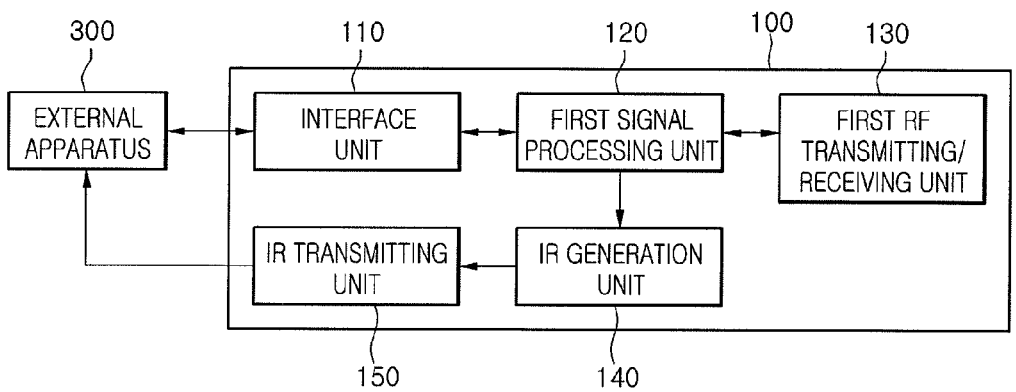
FIG. 3 is a block diagram illustrating a transmitting device according to an embodiment of the present invention.

Next, FIG. 3 is a block diagram illustrating a transmitting device according to an embodiment of the present invention. As shown, the transmitting device 100 includes an interface unit 110, a first signal processing unit 120, a first RF transmitting/receiving unit 130, an IR generation unit 140, and an IR transmitting unit 150. In addition, the interface unit 110 transmits and receives a signal to and from the external apparatus 300 via input terminals such as an HDMI, a USB, a component, an RGB, etc. for connecting the external apparatus 300.

In addition, the first signal processing unit 120 can convert signals received from the external apparatus 300, for example, a video signal and an audio signal into data of a wireless transmittable format in accordance with a predetermined wireless communication scheme and output the converted data. For example, when the signals received from the external apparatus 300 are encoded by a coding scheme such as MPEG, the first signal processing unit 120 can include an A/V processing unit for decoding the video and audio signals received from the external apparatus 300.

Also, the first RF transmitting/receiving unit 130 wirelessly transmits the signal output from the first signal processing unit 120 to the receiving device 200. To do this, the first RF transmitting/receiving unit 130 includes an antenna and a converter, i.e., an up-converter and a down-converter. Further, according to the embodiment of the present invention, the first RF transmitting/receiving unit 130 can receive control data for controlling the operation of the external apparatus 300 from the receiving device 200 using the wireless communication scheme, i.e., WiFi, WHDi, WiFi, or the like.

In addition, the IR generation unit 140 generates a remote control signal for controlling the operation of the external apparatus 300, that is, an infrared signal for the control data received from the receiving device 200. Further, the IR transmitting unit 150 transmits the infrared signal generated by the IR generation unit 140 to the external apparatus 300 and the external apparatus 300 performs an operation corresponding to the infrared signal transmitted from the IR transmitting unit 150 of the transmitting device 100. Therefore, the operation of the external apparatus 300 can be controlled using the infrared signal.

According to another embodiment of the present invention, the transmitting device 100 can transmit the control data wirelessly transmitted from the receiving device 200 to the external apparatus 300 through the interface unit 110. For example, the first signal processing unit 120 can convert the received control data into a signal of a format to be transmitted to the external apparatus 300 in accordance with an interface with the external apparatus 300 and output the signal, and the interface unit 110 can transmit the control data processed by the first signal processing unit 120 to the external apparatus 300. Accordingly, the external apparatus 300 can receive the control data through the interface unit 110 of the transmitting device 100 and perform an operation corresponding to the inputted control data.

Figure 4:
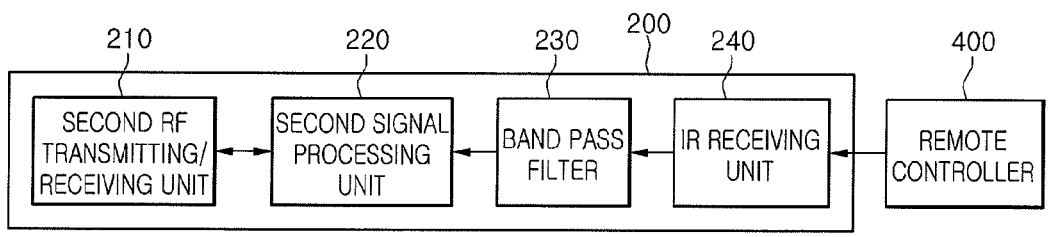
FIG. 4 is a block diagram illustrating a receiving device and a remote controller according to an embodiment of the present invention.

Next, FIG. 4 is a block diagram illustrating the receiving device 200 according to an embodiment of the present invention. As shown, the receiving device 200 includes a second RF transmitting/receiving unit 210, a second signal processing unit 220, a band pass filter 230, and an IR receiving unit 240. Further, the second RF transmitting/receiving unit 210 can wirelessly receive the media signal, for example, the video signal and the audio signal from the transmitting device 100 and for doing this includes an antenna and a converter, more specifically, an up-converter and a down-converter.

In addition, the second signal processing unit 220 can convert the signal received by the second RF transmitting/receiving unit 210 into a format that can be output in a display device. For example, when the signal received from the transmitting device 100 is encoded in accordance with a coding scheme such as MPEG, etc., the second signal processing unit 220 includes an A/V processing unit for decoding the received video and audio signals. Also, the IR receiving unit 240 can receive an infrared signal for controlling the operation of the external apparatus 300 connected to the transmitting device 100 from the remote controller 400. The band pass filter 230 also filters and extracts data for controlling the external apparatus 300 from the received infrared signal. Meanwhile, the extracted control data can be converted into a format wirelessly transmittable through the second signal processing unit 220, and thereafter be transmitted to the transmitting device 100 through the second RF transmitting/receiving unit 210. For example, the control data for the external apparatus 300 can be transmitted to the transmitting device 100 by using the wireless communication scheme such as the WiHD, WHDi, WiFi, or the like.

Hereinafter, a method for processing a remote control signal according to an embodiment of the present invention will be described. In more detail, an example in which a control signal is transmitted and received between the remote controller 400 and the receiving device 200 and between the transmitting device 100 and the external apparatus 300 will be described. However, the present invention is not limited to transmission and reception of the control signal using the infrared communication scheme and the remote control signal may be transmitted and received using various wireless communication methods, for example, the communication method using the RF signal or the optical signal in addition to the infrared communication scheme. Components in FIGS. 1 to 4 will also be referred to throughout the description.

Figure 5:
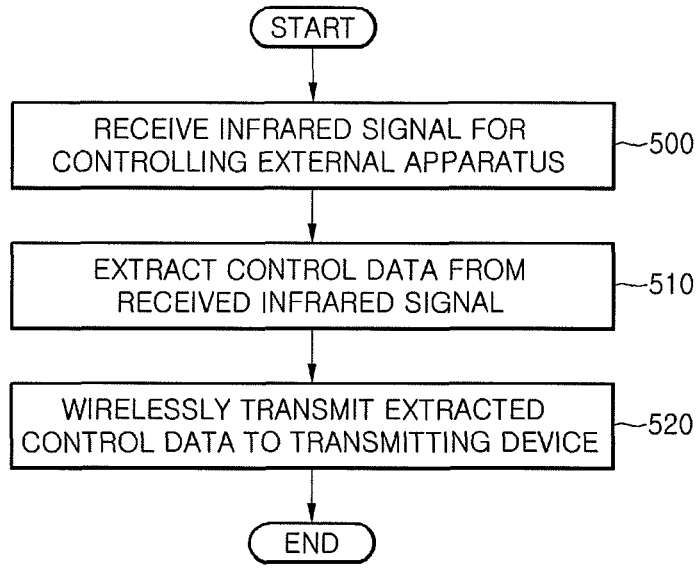
FIG. 5 is a flowchart illustrating a method for controlling an external device according to an embodiment of the present invention.

Turning first to FIG. 5, a flowchart illustrating a method for controlling an external device according to an embodiment of the present invention is shown. As shown in FIG. 5, the IR receiving unit 240 of the receiving device 200 receives an infrared signal transmitted from the remote controller 400 (step 500). As discussed above, the received infrared signal is a remote control signal for controlling an operation of the external apparatus 300 connected to the transmitting device 100. In more detail, the remote controller 400 can receive key inputs for controlling the operation of the external apparatus 300 connected to the transmitting device 100, and generate and transmit the infrared signal corresponding to the key inputs. The IR receiving unit 240 then receives the infrared signal transmitted from the remote controller 400.

Figure 7:
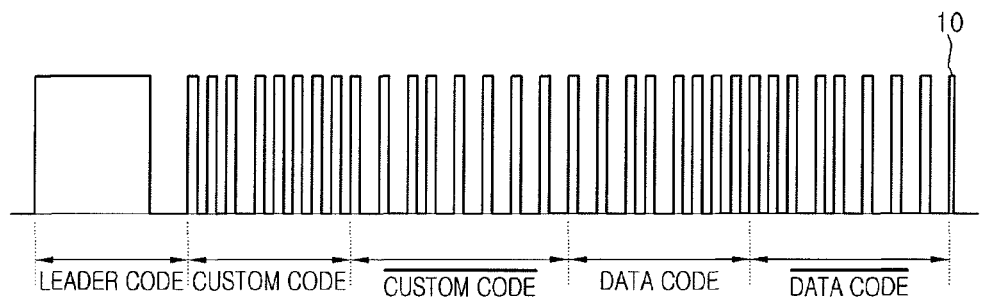
FIG. 7 is a diagram illustrating a code format of an infrared signal according to an embodiment of the present invention.

Further, the band pass filter 230 extracts data for controlling the operation of the external apparatus 300 from the received infrared signal (step 510). For example, as shown in FIG. 7, the infrared signal received from the remote controller 400 includes a leader code, a custom code, and a data code as data for controlling the external apparatus 300, and more specifically includes the leader code, the custom code, a custom code verification byte, the data code, and a data code verification byte. Further, each of the codes may have data of 2 bytes, that is, 8 bits and the infrared signal may include an ending signal bit (10).

Meanwhile, the control data can be transmitted from the remote controller 400 to the receiving device 200 by being loaded on a carrier signal having a predetermined frequency and a predetermined duty ratio. That is, the remote controller 400 can generate a baseband signal as the control data corresponding to the operation of the external apparatus 300, which the user inputs, and generate and transmit the infrared signal to the receiving device 200 by synthesizing the baseband signal with the carrier signal having the predetermined frequency and the predetermined duty ratio. Further, the carrier signal may have a frequency of 30 kHz to 60 kHz and a duty ratio of 1/2 to 1/3. The signals transmitted from the remote control 400 to the receiving device 200 will hereinafter be referred to as remote control signal or infrared signal.

Thus, according to the embodiment of the present invention, the infrared signal can be transmitted by synthesizing the baseband signal including the control data of the external apparatus 300 with the carrier signal having the frequency of 37 kHz and the duty ratio 1/3. For example, in the control data included in the baseband signal, the leader code may be constituted by a high of 9 ms and a low of 4.5 ms, bit '1' may be constituted by a high of 0.56 ms and a low of 1.69 ms, and bit '0' may be constituted by a high of 0.56 ms and a low of 0.565 ms. Further, the leader code, the custom code, and the data code may constitute one frame and the frame may be repeated at a cycle of 108 ms.

Also, in step 510, the band pass filter 230 can extract the baseband signal including the control data for the external data 300 by filtering the infrared signal received from the remote controller 400, and in which the baseband signal may be an envelope of the received infrared signal. For example, the band pass filter 230 may be a 38 kHz band pass filter. Therefore, the band pass filter 230 can extract the control data for controlling the external apparatus 300 by removing only the carrier frequency from the infrared signal input from the IR receiving unit 240 to detect only waveforms of the leader code, the custom code, and the data code.

The second RF transmitting/receiving unit 210 then wirelessly transmits the control data of the external apparatus 300, which is extracted by the band pass filter 230 to the transmitting device 100 (step 520). For example, the second signal processing unit 220 can convert the control data included in the baseband signal output from the band pass filter 230, that is, the leader code, the custom code, and the data code into data of a format which is wirelessly transmittable using the predetermined wireless communication scheme, i.e., the WiHD, the WHDi, the WiFi, or the like and output the signal to the second RF transmitting/receiving unit 210. The second RF transmitting/receiving unit 210 can then wirelessly transmit the control data of the external apparatus 300, which is output from the second signal processing unit 220, to the transmitting device 100.

As described above, the receiving device 200 extracts the baseband signal from the infrared signal received from the remote controller 400 and wirelessly transmits only the control data of the external apparatus 300, which is included in the baseband signal to the transmitting device 100 so as to reduce the amount of data wirelessly transmitted and received between the transmitting device 100 and the receiving device 200.

Figure 6:
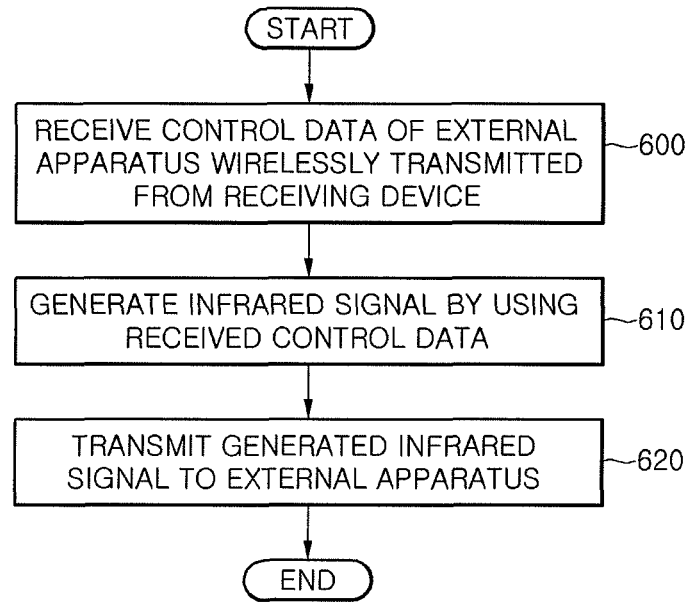
FIG. 6 is a flowchart illustrating a method for controlling an external device according to an embodiment of the present invention.

Next, FIG. 6 is a flowchart illustrating a method for controlling a remote control signal according to an embodiment of the present invention. In particular, FIG. 6 illustrates the transmitting device 100 processing the control data of the external apparatus 300, which wirelessly transmitted from the receiving device 200 as described in FIG. 5. As shown FIG. 6, the first RF transmitting/receiving unit 130 of the transmitting device 100 receives the control data of the external apparatus 300, which is wirelessly transmitted from the receiving device 200 (step 600).

For example, the control data received into the first RF transmitting/receiving unit 130 may be data included in the baseband signal among the infrared signal received into the receiving device 200 from the remote controller 400 in order to control the external apparatus 300 connected to the transmitting device 100. Further, in step S600, the control data of the external apparatus 300 received from the receiving device 200 includes the leader code, the custom code, and the data code. The IR generation unit 140 then generates an infrared signal, which is the remote control signal for controlling the operation of the external apparatus 300, using the control data received in the first RF transmitting/receiving unit 130 (step 610).

For example, the IR generation unit 140 can generate the baseband signal including the control data of the external apparatus 300 and generate the infrared signal by synthesizing the generated baseband signal with a carrier signal having a predetermined frequency and a predetermined duty ratio. More specifically, the IR generation unit 140 can generate the baseband signal to include the leader code, the custom code, and the data code of the control data received by the first RF transmitting/receiving unit 130, and synthesize the generated baseband signal with a carrier signal having a frequency of 37 kHz and a duty ratio of 1/3 and output the generated infrared signal. Further, the IR transmitting unit 150 transmits the infrared signal generated to the external apparatus 300 in order to control the operation of the external apparatus 300 (step 620). Therefore, the external apparatus 300 performs an operation corresponding to the infrared signal received from the IR transmitting unit 150 of the transmitting device 100.

Figure 8:
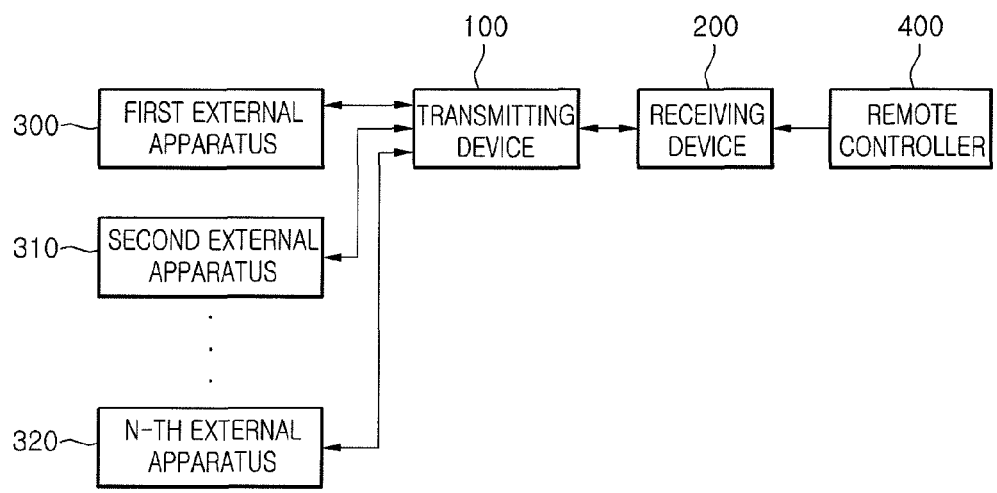
FIG. 8 is a block diagram illustrating a transmitting/receiving system according to yet another embodiment of the present invention.

Next, FIG. 8 is a block diagram illustrating a transmitting/receiving system according to another embodiment of the present invention. As shown in FIG. 8, a plurality of external apparatuses 300, 310, and 320 are connected to the transmitting device 100. The plurality of external apparatuses 300, 310, and 320 may be apparatuses that are connected to the transmitting device 100 to supply the media signal, for example, the video signal and the audio signal to the transmitting device 100. Further, the external apparatuses 300, 310, and 320 may be various devices including a video playing device such a Divix player, a blue-ray player, or the like, a set-top box such as an IPTV set-top box, a cable set-top box, a satellite set-top box, or the like, a PC, a game machine, a home theater, a portable terminal, a hard disk recorder, etc.

In addition, a user can perform key input for controlling the operation of any one of the plurality of external apparatuses 300, 310, and 320 using the remote controller 400, and the remote controller 400 then generates an infrared signal corresponding to the user's key input and transmits the generated infrared signal to the receiving device 200. Thus, as described above, the receiving device 200 can extract the control data for controlling the corresponding external apparatus from the infrared signal received from the remote controller 400 and transmit the control data of the external apparatus to the transmitting device 100 using the wireless communication scheme such as the WiHD, WHDi, WiFi, or the like.

Also, when the received remote control signal is the signal for controlling the operation of any one of the transmitting device 100 or the plurality of external apparatuses 300, 310, and 320, the received remote control signal can be wirelessly transmitted to the transmitting device 100 in addition to the apparatus identification information using the wireless communication scheme such as the WiHD, WHDi, WiFi, or the like. Further, the transmitting device 100 generates an infrared signal for controlling the corresponding external apparatus by using the control data received from the receiving device 200, and for example, can generate the infrared signal by synthesizing the baseband signal including the control data with a carrier signal having a predetermined frequency and a predetermined duty ratio as discussed above.

In addition, the transmitting device 100 transmits the generated infrared signal to the corresponding external apparatus. The transmitting device 100 can also verify which external apparatus of the plurality of external apparatuses 300, 310, and 320 the control data is used to control by analyzing the received control data. For example, the transmitting device 100 generates the infrared signal using the received control data to transmit the generated infrared signal to the first external apparatus 300 when the received control data is used to control the first external apparatus 300.

Meanwhile, in FIG. 8, the remote controller 400 is shown, but according to another embodiment of the present invention, a plurality of remote controllers corresponding to the plurality of external apparatuses 300, 310, and 320, respectively may be provided. Accordingly, an infrared signal transmitted from a predetermined remote controller may be transmitted to an external apparatus corresponding to the remote controller among the plurality of external apparatuses 300, 310, and 320 through the receiving device 200 and the transmitting device 100.

Figure 9:
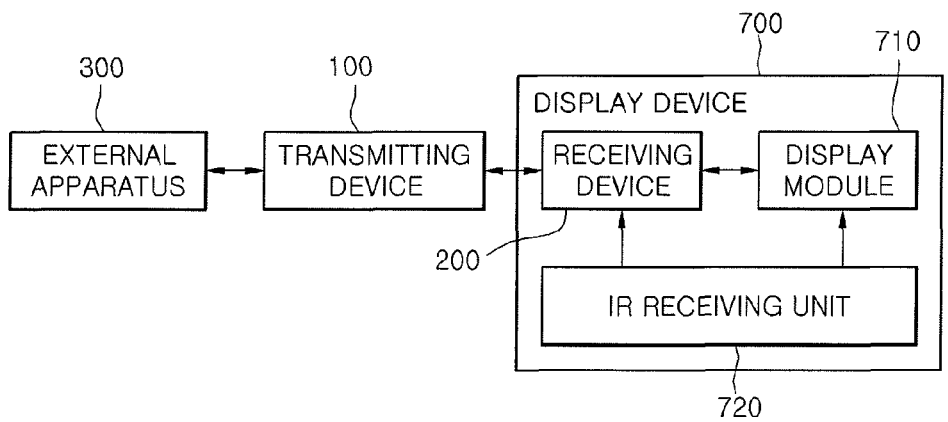
FIG. 9 is a block diagram illustrating a transmitting/receiving system according to still another embodiment of the present invention.

Next, FIG. 9 is a block diagram illustrating a transmitting/receiving system according to another embodiment of the present invention. As shown in FIG. 9, a display device 700 includes the receiving device 200 having the above-mentioned configuration and a display module 710. That is, the transmitting device 100 receives the media signal from the external apparatus 300 and wirelessly transmits the received media signal to the receiving device 200, and the receiving device 200 provided in the display device 700 processes the wirelessly transmitted data into a video signal of a displayable format and outputs the processed data to the display module 710. Thus, in this embodiment, the receiving device 200 is integrated within the display device 700.

Further, the display module 710 can display a video using the video signal input from the receiving device 200. In particular, the display module 710 includes display panels of various display types such as a liquid crystal display (LCD), a plasma display panel (PDP), an electro luminescent display (ELD), a vacuum fluorescent display (VFD), etc. In addition, an IR receiving unit 720 provided in the display device 700 can receive the infrared signal for controlling the external apparatus 300, which is transmitted from the remote controller 400. Also, as described above, the receiving device 200 provided in the display device 700 extracts the control data of the external apparatus 300 from the infrared signal received from the remote controller 400 to wirelessly transmit the extracted control data to the transmitting device 100.

Figure 10:
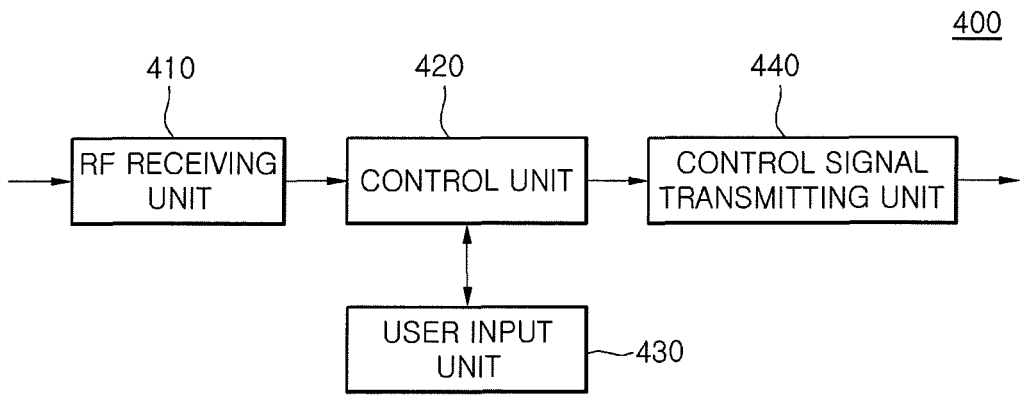
FIG. 10 is a block diagram illustrating a remote controller according to an embodiment of the present invention.

Next, FIG. 10 is a block diagram illustrating the remote controller 400 according to an embodiment of the present invention. As shown, the remote controller 400 includes an RF receiving unit 410, a control unit 420, a user input unit 430, and a control signal transmitting unit 440. Further, the RF receiving unit 410 can receive information on the external apparatus 300 wirelessly transmitted from the transmitting device 100. Also, the user input unit 430 includes a plurality of key buttons for user inputs or displays the plurality of key buttons using a touch panel to receive an input for controlling the operation of the external apparatus 300 from the user. The control signal transmitting unit 440 can also generate and transmit the user inputs using the user input unit 430, that is, a remote control signal corresponding to the operation of the external apparatus 300 which the user wants.

Thus, according to embodiments of the present invention, the control signal transmitting unit 440 of the remote controller 400 can transmit the generated remote control signal to the receiving device 200. Further, the external apparatus 300 can be controlled by transmitting the remote control signal transmitted to the receiving device 200 through a wireless network in the transmitting device 100. The control unit 420 also controls the overall operation of the remote controller 400, i.e., the operations of the user input unit 430 and the control signal transmitting unit 440.

In addition, the control unit 420 can control the user input unit 430 to display changed key buttons for user's input depending on the external apparatus 300 connected to the transmitting device 100 using the information on the external apparatus 300 received from the transmitting device 100 or the receiving device 200 through the RF receiving unit 410.

Figure 11:
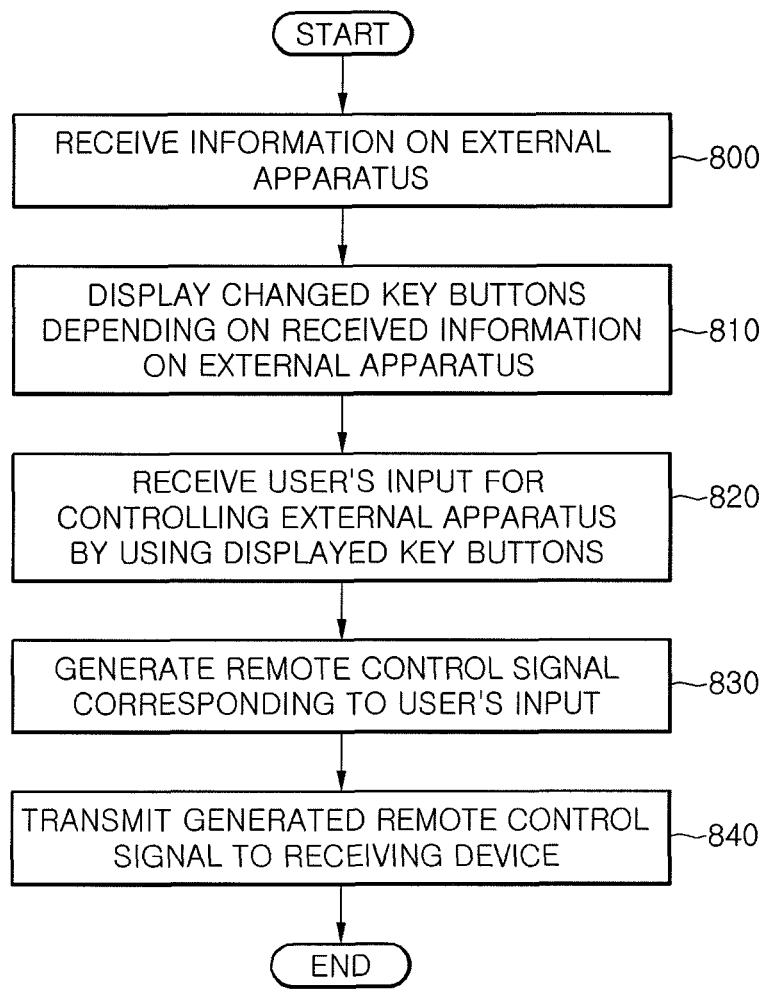
FIG. 11 is a flowchart illustrating a method for controlling an external device according to a third embodiment of the present invention.

In more detail, FIG. 11 is a flowchart illustrating a method for controlling an external apparatus according to an embodiment of the present invention. As shown in FIG. 11, the RF receiving unit 410 receives the information on the external apparatus 300 from the transmitting device 100 or the receiving device 200, i.e., a signal corresponding to the type of the external apparatus 300 (step 800). More specifically, the RF receiving unit 410 can receive the information on the external apparatus 300 from the transmitting device 100 using various wireless communication schemes such as Bluetooth, ZigBee, RF communication, or the like. The user input unit 430 then displays the changed key buttons for the user input depending on the received information on the external apparatus 300 (step 810), and the user can perform input operations for controlling the operation of the external apparatus 300 using the displayed key buttons (step 820).

For example, the control unit 420 can determine the type of the external apparatus 300 connected to the transmitting device 100 and control the user input unit 430 to differently display the changed key buttons depending on the determined type of the external apparatus 300. More specifically, the key buttons required to control the operation of the external apparatus 300 may be different from each other depending on the type of the external apparatus 300. Thus, the user input unit 430 can display key buttons among the plurality of key buttons corresponding to the external apparatus 300, that is, the key buttons required to control the operation of the external apparatus 300 to be identified to the user.

In addition, in one embodiment of the present invention, the user input unit 430 can include the plurality of key buttons which the user can select and press and display the key buttons corresponding to the external apparatus 300 to be identified from the rest of key buttons among the plurality of key buttons. Thereafter, the control signal transmitting unit 440 generates the user's input using the user input unit 430, that is, a remote control signal corresponding to the operation of the external apparatus 300 which the user wants (step 830) and transmits the generated remote control signal to the receiving device 200 (step 840).

Figure 12:
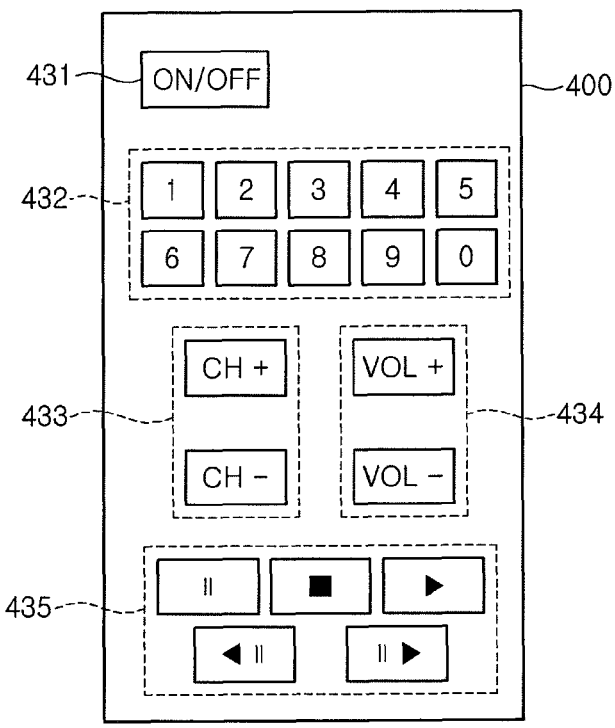
FIGS. 12 to 14 are diagrams illustrating methods for displaying a key button of a remote controller according to an embodiment of the present invention.
Figure 13:
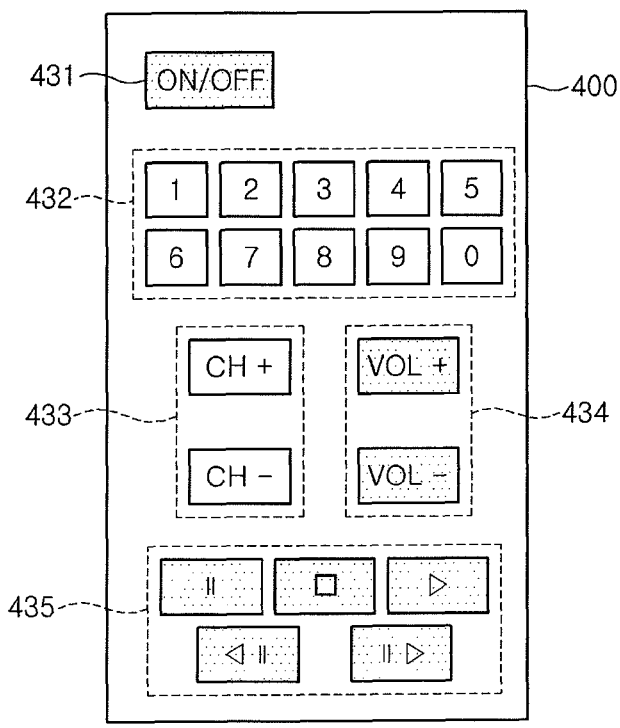

For example, as shown in FIG. 12, the remote controller 400, more specifically, the user input unit 430 provided in the remote controller 400 includes a plurality of key buttons, i.e., a power on/off button 431, numeric buttons 432, channel up/down buttons 433, volume up/down buttons 434, and buttons 435 for playing video. Further, FIG. 13 is a diagram illustrating the remote controller 400 shown in FIG. 12 displaying changed key buttons depending on the external apparatus 300. In this example, the external apparatus 300 connected to the transmitting device 100 through the external input is a 'DVD player'. By considering the operation of the external apparatus 300 which is the 'DVD player', the numeric buttons 432 and the channel up/down buttons 433 among the key buttons shown in FIG. 12 are key buttons that are not required to control the external apparatus 300.

Therefore, as shown in FIG. 13, the remote controller 400 displays the power on/off button 431, the volume up/down buttons 434, and the buttons 435 for playing the video that are required to control the external apparatus 300 which is the 'DVD player' to be identified from the rest of the unnecessary numeric buttons 432 and channel up/down buttons 433. More specifically, the power on/off button 431, the volume up/down buttons 434, and the buttons 435 for playing the video corresponding to the external apparatus 300 are turned on and the rest of the numeric buttons 432 and channel up/down buttons 433 are turned off and thus are displayed dark.

In more detail, each of the key buttons 431-435 provided in the remote controller 400 include light sources controlled by the control unit 420. Thus, only the key buttons among the plurality of key buttons 431-435 corresponding to the external apparatus 300, that is, the power on/off button 431, the volume up/down buttons 434, and the buttons 435 for playing the video are activated or lit, while the rest of the numeric buttons 432 and channel up/down buttons 433 are deactivated. Further, even if the key buttons that do not correspond to the external apparatus 300, that is, the numeric buttons 432 and the channel up/down buttons 433 are pressed by the user, the resulting operation is not performed.

Figure 14:
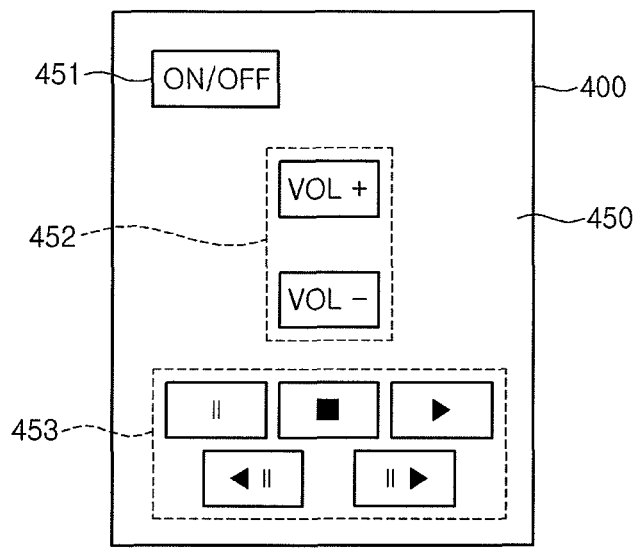

According to yet another embodiment of the present invention, the user input unit 430 can display the key buttons corresponding to the external apparatus 300, that is, only key buttons required to control the operation of the external apparatus 300. For example, as shown in FIG. 14, the remote controller 400, more specifically, the user input unit 430 includes a touch panel 450 for displaying the plurality of key buttons and receiving the user input for the displayed key buttons.

Further, the control unit 420 displays only the key buttons corresponding to the external apparatus 300 on the touch panel 450. That is, when the external apparatus 300 connected to the transmitting device 100 through the external input is the 'DVD player', only the key buttons corresponding to the external apparatus 300, that is, the power on/off button 431, the volume up/down buttons 434, and the buttons 435 for playing the video that are required to control the operation of the external apparatus 300 are displayed on the touch panel 450 as shown in FIG. 14.

Figure 15:
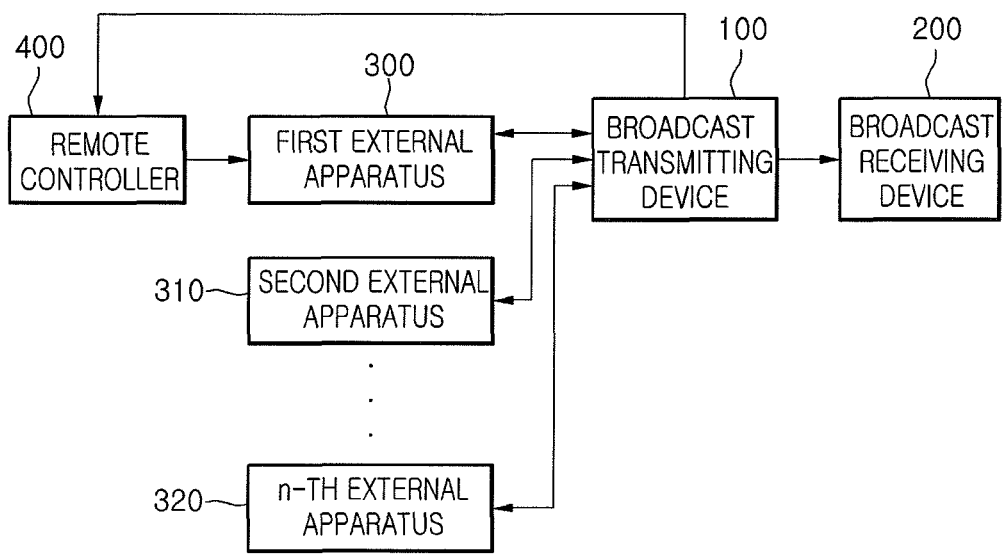
FIG. 15 is a block diagram illustrating a transmitting/receiving system according to another embodiment of the present invention.

Next, FIG. 15 is a block diagram illustrating a transmitting/receiving system according to yet another embodiment of the present invention. As shown in FIG. 15, the plurality of external apparatuses 300, 310, and 320 are connected to the transmitting device 100. As discussed previously, the plurality of external apparatuses 300, 310, and 320 may be apparatuses that are connected to the transmitting device 100 to supply the media signal, for example, the video signal and the audio signal to the transmitting device 100. Further, the external apparatuses 300, 310, and 320 may be various devices including a video playing device such a Divix player, a blue-ray player, or the like, a set-top box such as an IPTV set-top box, a cable set-top box, a satellite set-top box, or the like, a PC, a game machine, a home theater, a portable terminal, a hard disk recorder, etc.

In addition, the transmitting device 100 receives a signal, i.e., the video signal and the audio signal from any one of the plurality of external apparatuses 300, 310, and 320 through an external input of a signal to be wirelessly transmitted to the receiving device 200. Also, as described above, the transmitting device 100 wirelessly transmits information on any external apparatus connected to the external input among the plurality of external apparatuses 300, 310, and 320 to the remote controller 400. Further, the remote controller 400 displays changed key buttons for user's input depending on the information on the external apparatus, which is received from the transmitting device 100. For example, when the transmitting device 100 is connected to the second external apparatus 310 which is the 'DVD player' through the external input, the transmitting device 100 transmits information indicating that the currently connected external apparatus is the second external apparatus 310 which is the 'DVD player' to the remote controller 400.

Figure 16:
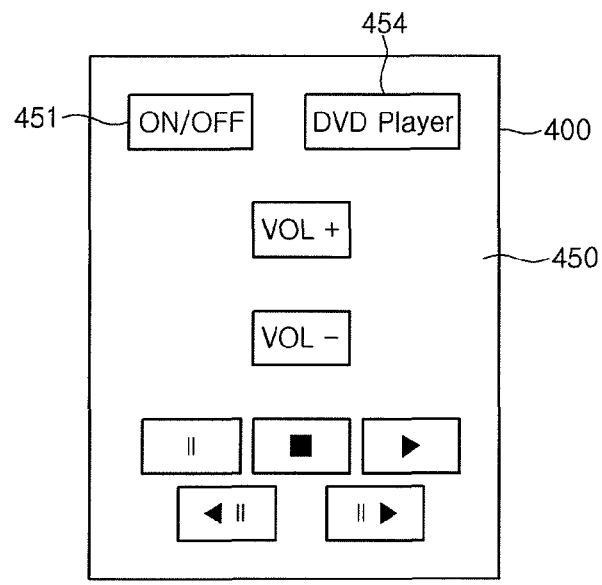
FIG. 16 is a diagram illustrating a method for displaying a key button of a remote controller according to another embodiment of the present invention.

Therefore, as shown in FIG. 16, key buttons corresponding to the 'DVD player' are displayed on the user input unit 430 provided in the remote controller 400, for example, the touch panel 450, and information indicating that the external apparatus which can be currently controlled by using the remote controller 400 is the 'DVD player' is displayed at a predetermined region 454. According to yet another embodiment of the preset invention, as shown in FIG. 15, the remote controller 400 can directly transmit the remote control signal for controlling the external apparatus to the corresponding external apparatus.

That is, when the user who uses the remote controller 400 is positioned sufficiently close or adjacent to the external apparatus to be controlled, the remote controller 400 can directly transmit the remote control signal to the corresponding external apparatus. However, when the user is positioned adjacent to the receiving device 200 that is far away from the external apparatus, the remote controller 400 transmits the remote control signal to the receiving device 200 so as to transmit the remote control signal to the corresponding external apparatus through the receiving device 200 and the transmitting device 100 as described above.

Figure 17:
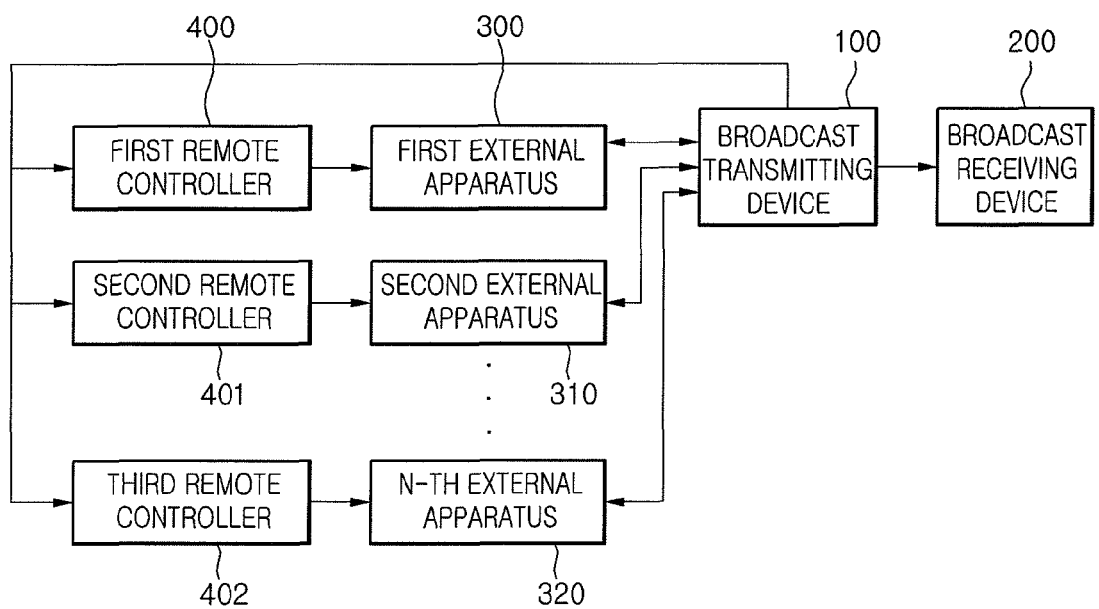
FIG. 17 is a block diagram illustrating a transmitting/receiving system according to still another embodiment of the present invention.

Next, FIG. 17 is a block diagram illustrating a transmitting/receiving system according to still another embodiment of the present invention. As shown in FIG. 17, the plurality of remote controllers 400, 401, and 402 are used to control the plurality of external apparatuses 300, 310, and 320, respectively. Further, the plurality of remote controller 400, 401, and 402 can receive information on a particular external apparatus among the plurality of external apparatuses 300, 310, and 320, which is connected to the external input from the transmitting device 100. Meanwhile, the plurality of remote controllers 400, 401, and 402 can verify whether or not to control the external apparatus currently connected through the external input using the information on the external apparatus, which is received from the transmitting device 100.

Therefore, information indicating whether or not to control the currently selected external apparatus can be displayed on each of the plurality of remote controller 400, 401, and 402. For example, when the transmitting device 100 is connected to the second external apparatus 310 which is the 'DVD player' through the external input, the transmitting device 100 can transmit information indicating that the currently connected external apparatus is the second external apparatus 310 which is the 'DVD player' to the remote controllers 400, 401, and 402. The plurality of remote controllers 400, 401, and 402 that receive the information on the external apparatuses can verify whether or not to control the second external apparatus 310. In this instance, the second remote controller 401 can control the second external apparatus 310 connected to the transmitting device 100 through the external input and the rest of the remote controllers do not control the second external apparatus 310.

Figure 18:
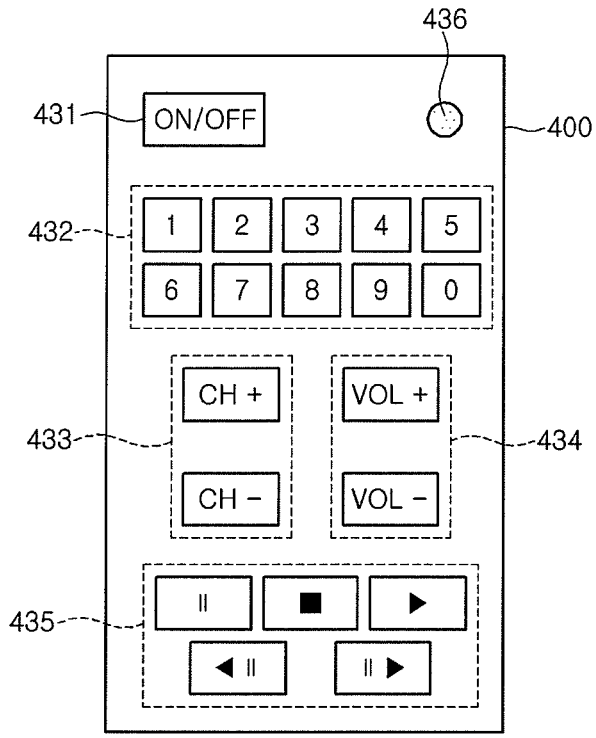
FIGS. 18 to 20 are diagrams illustrating a method for displaying a key button of a remote controller according to other embodiments of the present invention.

Referring to FIG. 18, the remote controller 400 (and other remote controllers) can include a display having a region 436 indicating whether or not the corresponding controller can control the external apparatus. In this example, the region 436 indicates that the second external apparatus 310 cannot be controlled using the remote controller 400 (e.g., the light is turned off in the region 436 indicating the apparatus 310 can not be controlled). Further, at the same time, all key buttons 431-435 can be maintained in a deactivated state indicating the first remote controller 400 cannot control the second external apparatus 310 selected as the external input.

Figure 19:
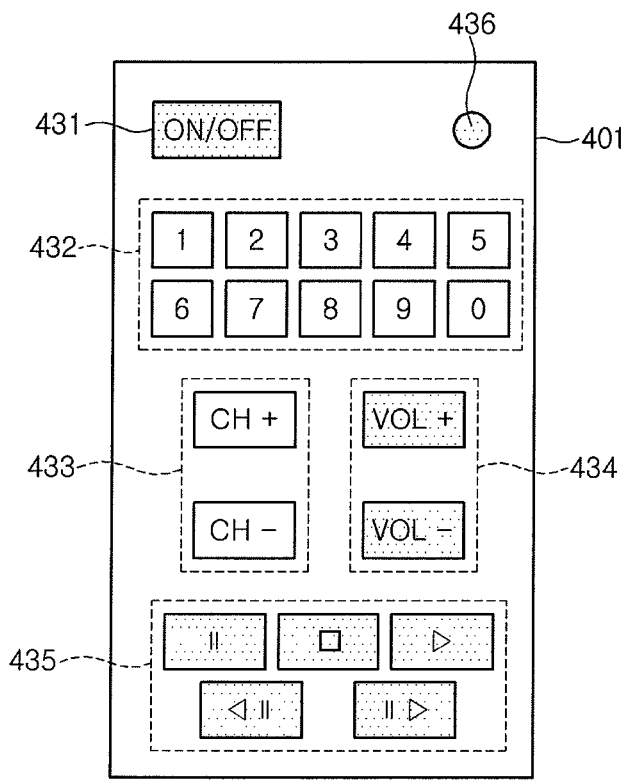
Figure 20:
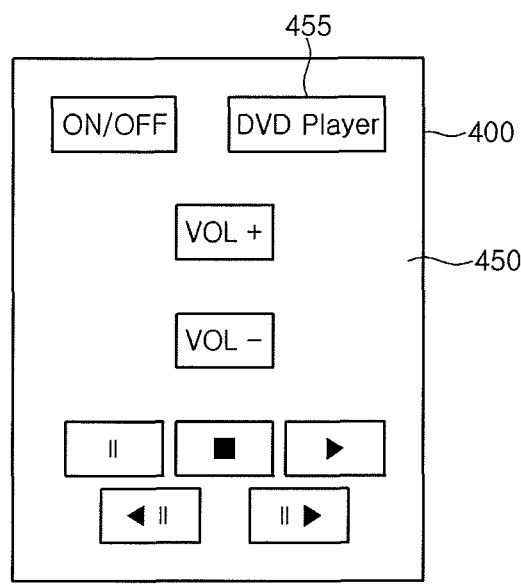

Meanwhile, referring to FIG. 19, the second remote controller 401 that can control the second external apparatus 310 selected as the external input turns on the light in the region 436 and at the same time activates the power on/off button 431, the volume up/down buttons 434, and the buttons for playing the video to indicate the remote controller 401 can control the second external apparatus 310. Further, referring to FIG. 20, the remote controller 401 can include a display region 455 for displaying the external apparatus that can be controlled (the DVD player in this example).

In addition, the embodiments of the present invention have been described using the situation where the remote controller 400 receives the information on the external apparatus 300 from the transmitting device 100. However, the present invention is not limited to this arrangement. For example, the remote controller 400 can receive the information on the external apparatus 300 currently connected to the transmitting device 100 from the receiving device 200. To do this, the receiving device 200 receives the information on the external apparatus 300 from the transmitting device 100 using the wireless network or previously stores the information.

Thus, according to embodiments of the present invention, a receiving device receives a remote control signal for an external apparatus connected to a transmitting device and wirelessly transmits the remote control signal to the transmitting device to control the external apparatus, such that a user who uses the receiving device can control external apparatuses provided in a transmitting/receiving system using a remote control device such as a remote controller, etc., thereby improving the user's convenience. Further, it is possible to easily control a plurality of external apparatuses with a small number of key buttons by displaying changed key buttons of the remote control device depending on the external apparatus connected to the transmitting device, thereby improving the user's convenience.

In addition, embodiments of the present invention can be implemented by a computer-readable recording medium in which a program to be executed is recorded. The described embodiments can be stored in a computer-readable recording medium by being produced as a program to be executed in a computer. An example of the computer-readable recording medium includes a ROM, a RAM, a CD-ROM, a magnetic tape, a floppy disk, an optical data storage, etc. and in addition, also includes Internet transmissions. The computer-readable recording media are distributed on computer systems connected through a network, and thus a computer-readable code may be stored and executed by a distribution scheme. In addition, a functional program, a code, and code segments for implementing the control method will be easily interred by programmers skilled in the art.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling devices connected together, the method comprising:
    determining a type of a first device when the first device is connected to a transmitting device;
    determining what key buttons on a remote controller are needed to operate the determined type of the first device;
    activating the key buttons on the remote controller that are needed to operate the determined type of the first device;
    receiving an input signal indicating a selection of at least one key button needed to operate the determined type of the first device;
    transmitting the received input signal to a second device that is different than the first device;
    generating, by the second device, a remote control signal corresponding to the received input signal;
    transmitting, by the second device, the generated remote control signal to the first device; and
    performing a function on the first device corresponding the input signal indicating the selection of said at least one key button on the remote controller.

2. The method of claim 1, wherein the activating step comprises:
    turning on backlight units only for the key buttons on the remote controller that are determined to be needed to operate the determined type of the first device.

3. The method of claim 1, wherein the activating step comprises:
    displaying only soft key buttons on a touch screen of the remote controller that are needed to operate the determined type of the first device.

4. The method of claim 1, further comprising:
    determining if the remote controller controls the first device.

5. The method of claim 4, wherein when the determining step determines the remote controller does not control the first device, the method further comprises displaying an indicator on the remote controller that the remote controller does not control the first device.

6. The method of claim 4, wherein when the determining step determines the remote controller does not control the first device, the method further comprises turning off all backlight units for the key buttons on the remote controller.

7. The method of claim 1, wherein the transmitting device is separated from the first device or is included in the first device, and is configured to convert at least one of an audio/video and data signal received from the first device into a wireless signal and to transmit the converted wireless signal to the second device.

8. The method of claim 7, wherein the wireless signal transmitted from the transmitting device to the second device include wireless signals using at least one of WiHD, WHDi and WiFi.

9. The method of claim 1, wherein the remote control signal is any one of an infrared signal, an RF signal and an optical signal.

10. The method of claim 1, wherein the first device at least one of a Divix player, a home theatre system, a disc recorder, a Blu Ray player, a DVD player, and a game player, and the second device includes a television.

11. A system for controlling devices connected together, the system comprising:
    a display device including:
        a remote control interface; and
        an extraction device;
    a remote control configured to interface and control an operation of the display device through the remote control interface; and
    a transmitting device configured to interface with an external apparatus and the display device,
    wherein when an input key is selected on the remote control intended for performing an operation on the external apparatus, the remote control is further configured to generate a first remote control signal including control data corresponding to performing the operation on the external apparatus and to transmit the remote control signal to the remote control interface of the display device, the display device is further configured to convert the first remote control signal received from the remote control including the control data into a wireless control communication signal different than the first remote control signal and to transmit the wireless communication signal to the transmitting device, and the transmitting device is further configured to receive the wireless communication signal from the receiving device, generate a second remote control signal that includes the control data and transmit the second remote control signal including the control data to the external apparatus such that the external apparatus is operated via the remote control interfacing with the display device, and wherein the display device further includes:
    a band pass filter configured to extract the control data for performing the operation on the external apparatus from the first remote control signal;
    a signal processor configured to convert the first remote control signal received from the remote control including the control data into the wireless control communication signal; and
    a transmitter configured to transmit the wireless communication signal to the transmitting device.

12. The system of claim 11, wherein the remote control further includes a control unit configured to determine a type of external apparatus connected to the transmitting device, to determine what key buttons on the remote control are needed to operate the determined type of the external apparatus, and to activate only the key buttons on the remote control that are needed to operate the determined type of the external apparatus.

13. The system of claim 12, wherein the control unit of the remote control is further configured to activate only the key buttons on the remote control that are needed to operate the determined type of the external apparatus by turning on backlight units only for the key buttons on the remote controller that are determined to be needed to operate the determined type of the first device or by displaying only soft key buttons on a touch screen of the remote controller that are needed to operate the determined type of the first device.

14. The system of claim 12, wherein the remote control includes a touch screen configured to display soft touch key buttons that are needed to operate the determined type of the external apparatus.

15. The system of claim 12, wherein the remote control further includes an indication area configured to indicate the determined type of the external apparatus.

16. A method for controlling a device, the method comprising:
    determining a type of a first device;
    determining what key buttons on a remote controller are needed to operate the determined type of the first device;
    activating the key buttons on the remote controller that are needed to operate the determined type of the first device;
    receiving an input signal indicating a selection of at least one key button needed to operate the determined type of the first device;
    transmitting the received input signal to the first device;
    performing a function on the first device corresponding to the input signal indicating the selection of said at least one key button on the remote controller; and
    determining if the remote controller controls the first device,
    wherein when the determining step determines the remote controller does not control the first device, the method further comprises displaying an indicator on the remote controller that the remote controller does not control the first device, and
    wherein when the determining step determines the remote controller does not control the first device, the method further comprises turning off all backlight units for the key buttons on the remote controller.

17. The method of claim 16, wherein the activating step further comprises:
    turning on backlight units only for the key buttons on the remote controller that are determined to be needed to operate the determined type of the first device.

18. The method of claim 16, wherein the activating step further comprises:
    displaying only soft key buttons on a touch screen of the remote controller that are needed to operate the determined type of the first device.

19. The method of claim 16, wherein a transmitting device is separated from the first device or is included in the first device, and
    wherein the transmitting device is configured to convert at least one of an audio/video and data signal received from the first device into a wireless signal and to transmit the converted wireless signal to a second device.

\* \* \* \* \*